(12) United States Patent
Chandrasekaran et al.

(10) Patent No.: US 6,738,971 B2
(45) Date of Patent: May 18, 2004

(54) USING A RESOURCE MANAGER TO COORDINATE THE COMITTING OF A DISTRIBUTED TRANSACTION

(75) Inventors: Sashikanth Chandrasekaran, Belmont, CA (US); Hasan Rizvi, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/266,046

(22) Filed: Mar. 10, 1999

(65) Prior Publication Data

US 2002/0194242 A1 Dec. 19, 2002

(51) Int. Cl.[7] .................................................. G06F 9/46
(52) U.S. Cl. ........................ 718/100; 718/101; 718/102
(58) Field of Search ............................ 709/300, 1–108; 707/202, 103 R, 103; 718/100–108

(56) References Cited

U.S. PATENT DOCUMENTS

| | | | | |
|---|---|---|---|---|
| 5,276,876 A | * | 1/1994 | Coleman et al. ............. | 709/104 |
| 5,377,016 A | * | 12/1994 | Kashiwagi et al. .......... | 358/403 |
| 5,680,610 A | * | 10/1997 | Smith et al. ................. | 358/403 |
| 5,734,896 A | * | 3/1998 | Rizvi et al. .................. | 707/10 |
| 5,884,327 A | * | 3/1999 | Cotner et al. ................ | 707/202 |
| 6,105,147 A | * | 8/2000 | Molloy ........................ | 358/403 |
| 6,138,169 A | * | 10/2000 | Freund et al. ............... | 709/104 |
| 6,151,607 A | * | 11/2000 | Lomet ......................... | 707/201 |
| 6,205,464 B1 | * | 3/2001 | Cobb et al. .................. | 358/403 |
| 6,233,587 B1 | * | 5/2001 | Tandon ........................ | 358/403 |
| 6,253,212 B1 | * | 6/2001 | Loaiza et al. ............... | 707/202 |
| 6,266,698 B1 | * | 7/2001 | Klein et al. ................. | 709/101 |

* cited by examiner

Primary Examiner—Meng-Al T. An
Assistant Examiner—Kenneth Tang
(74) Attorney, Agent, or Firm—Hickman Palermo Truong & Becker LLP; Edward A. Becker

(57) ABSTRACT

A method and apparatus are provided for using a resource manager to coordinate the committing of a distributed transaction. According to the method, a first set of changes is communicated to a first resource manager. In communicating the first set of changes, the changes are directly communicated to the first resource manager without being received at a second resource manager. A second set of changes is communicated to the second resource manager. In communicating the second set of changes, the changes are directly communicated to the second resource manager without being received at the first resource manager. Either the first resource manager or the second resource manager is selected as a committing coordinator. A commit request message is transmitted to the committing coordinator to request that the first set of changes be committed at the first resource manager and that the second set of changes be committed at the second resource manager. In response to receiving the commit request message, the committing coordinator causes, as an atomic unit of work, the first set of changes to be committed at the first resource manager and the second set of changes to be committed at the second resource manager.

68 Claims, 7 Drawing Sheets

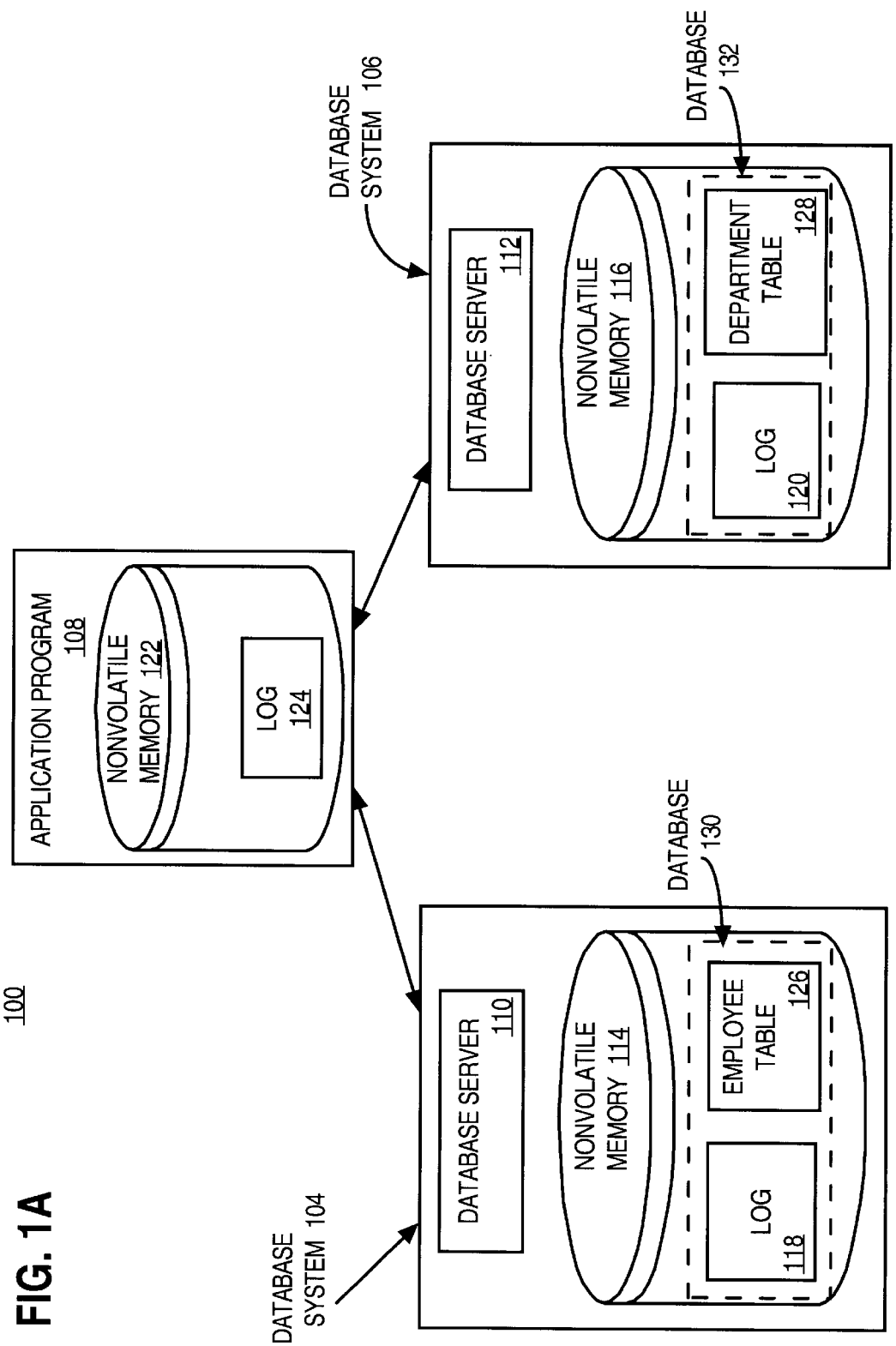

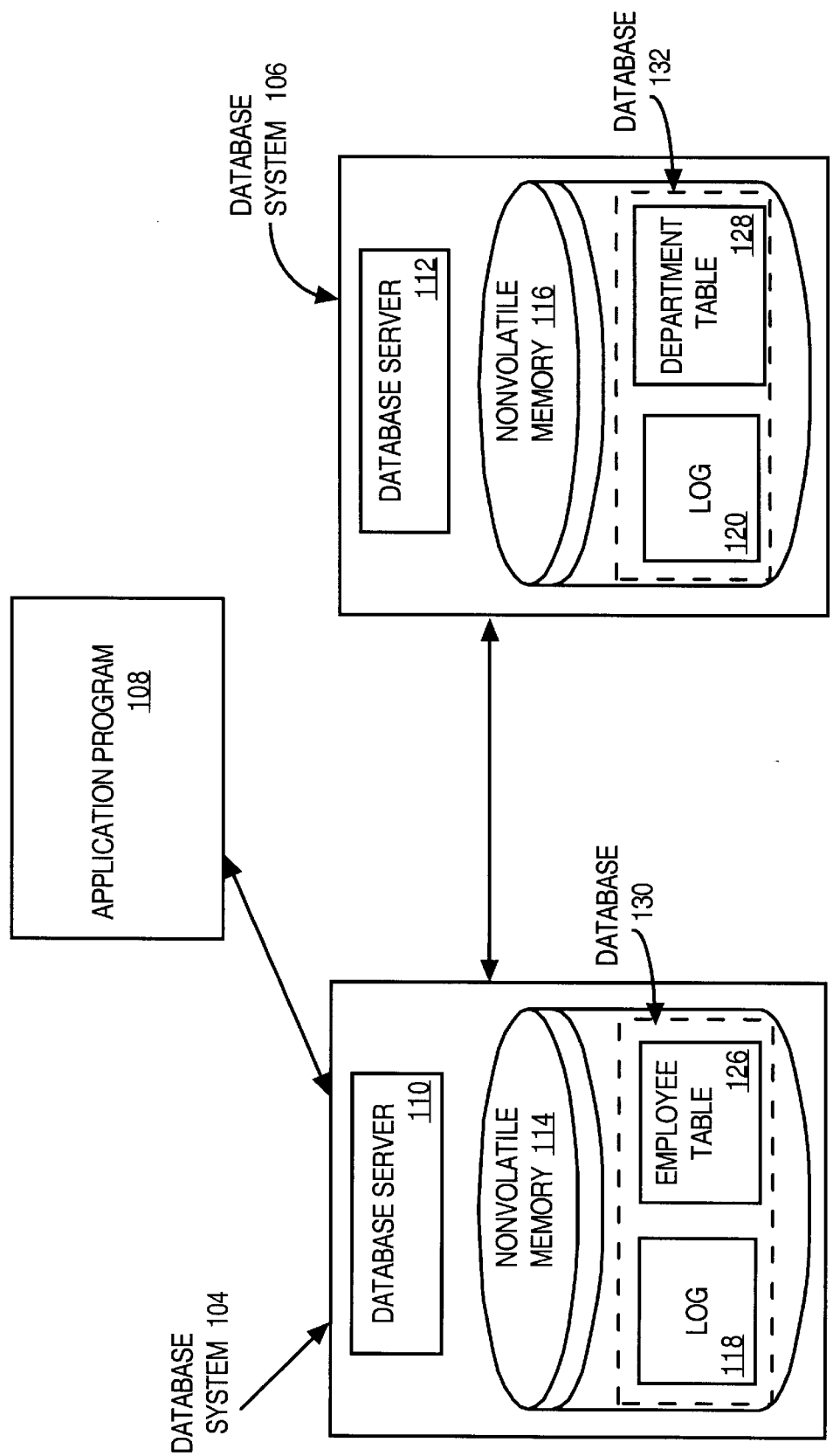

USING A RESOURCE MANAGER TO COORDINATE THE COMITTING OF A DISTRIBUTED TRANSACTION

FIELD OF THE INVENTION

The present invention generally relates to distributed computing systems, and more specifically to using a resource manager to coordinate the committing of a distributed transaction.

BACKGROUND OF THE INVENTION

One of the long standing challenges in distributed computing has been to maintain data consistency across all of the nodes in a network. Perhaps nowhere is data consistency more important than in a distributed transaction system where distributed transactions may specify updates to related data residing on different resource managers. In this context, a distributed transaction is a transaction that includes a set of operations that need to be performed by multiple resource managers. A resource manager, in turn, is any entity that manages access to a resource. Examples of resource managers include queues, file server systems and database systems.

To accomplish a distributed transaction that involves multiple resource managers, each of the resource managers is assigned to do a set of operations. The set of operations that need to be performed by a given resource manager is generally referred to as a child transaction. For example, a particular distributed transaction may include a first of set operations that need to be performed by a first resource manager and a second set of operations that need to be performed by a second resource manager. In distributed systems, the first and second sets of operations are generally referred to as first and second child transactions.

One approach for ensuring data consistency during distributed transactions involves processing distributed transactions using a two-phase commit mechanism. Two-phase commit requires that the transaction first be prepared and then committed. During the prepare phase, the changes specified by the transaction are made durable at each of the participating resource managers. If all of the changes are made without durable error at each of the participating resource managers, then the changes are committed (made permanent). On the other hand, if any errors occur during the prepare phase, indicating that at least one of the participating resource managers could not make the changes specified by the transaction, then all of the changes at each of the participating resource managers are retracted, restoring each participating resource manager to its state prior to the changes. This approach ensures data consistency while providing simultaneous processing of the changes.

In certain distributed computer systems, an application program, or separate tp-monitor is used to coordinate the processing of a two-phase commit for distributed transactions. For the purpose of explanation, the processing of distributed transactions shall be described in the context of a distributed transaction in which the resource managers involved in the distributed transaction are database systems. For example, FIG. 1A illustrates a distributed database system 100 in which distributed transactions can be performed. As depicted, distributed database system 100 includes an application program 108 and a plurality of database systems 104 and 106. Application program 108 interacts with database systems 104 and 106 to perform distributed transactions that involve access to data managed by database systems 104 and 106.

Database systems 104 and 106 respectively include database server processes 110 and 112, and nonvolatile memory areas 114 and 116. Nonvolatile memories 114 and 116 represent nonvolatile storage, such as a magnetic or optical disk, which can be used to durably store information. In this example, nonvolatile memories 114 and 116 respectively include databases 130 and 132. Database 130 includes a log 118 and an employee table 126. Database 132 includes a log 120 and a department table 128.

Database servers 110 and 112 respectively manage the resources of database systems 104 and 106. Database systems 104 and 106 may be either homogenous or heterogeneous systems. For example, database systems 104 and 106 may both be Oracle® database server systems. Alternatively, database system 104 may be an Oracle® database server system while database system 106 may be an IBM® database server system such as DB2®. Although not shown, database systems 104 and 106 generally include an application program interface (API) that allows them to communicate with application program 108 using their native protocol language.

Application program 108 includes a set of one or more processes that are used to coordinate the execution of distributed transactions on database systems 104 and 106. In coordinating the execution of a distributed transaction, application program 108 communicates with database systems 104 and 106 using the native language of each of the respective database systems. For example, if database system 104 is an Oracle database system, application program 108 may communicate with database system 104 using a communication protocol such as the Oracle Call Interface (OCI) protocol. Optionally, if database system 106 is an IBM DB2 database system, application program 108 may communicate with database system 106 using a communication protocol such as the SQL/DS protocol.

To coordinate a two-phase commit sequence, application program manager 108 first prepares the various child transactions of the distributed transaction at the database servers that are responsible for performing the child transactions. After the application manager 108 has determined that all of the database servers have prepared their respective child transactions, the application program informs all of the database servers to commit the child transactions. If any database server is unable to complete its child transaction, then the application program informs all of the database servers to roll back their respective child transactions.

Because application 108 is responsible for coordinating the processing of distributed transactions between database systems 104 and 106, application program 108 is typically required to store "participation" information in nonvolatile memory. In general, the participation information includes the list of resource managers that are participating in the distributed transaction ("participants") and a set of identifiers for identifying the child transactions. This participation information is stored before the application program sends the prepare commands to the participants in the distributed transaction. To maintain the participant information, application 108 includes a log 124 within a nonvolatile memory area 122. If the application program fails before sending the prepare commands, the participants will rollback their changes since they were never in the prepared state.

However, if the application program fails after sending the prepare commands, but before sending the commit commands, the application program can use the participation information in its log to query each participant to determine, depending on the outcome of the distributed transaction, whether a commit or rollback command should be sent to the participants.

For example, a user may submit a command though application 108 to add a new employee record into distributed database system 100 for company "A". In this example, it is assumed that employee table 126 stores personal employee information that needs to be stored for each employee of company A. It is also assumed that department table 128 stores departmental information that needs to be stored for each employee that is currently working at company A.

To add a new employee record, a user submits a command though application 108 to insert the new employee information into distributed database system 100. Upon receiving the command, application 108 coordinates the execution of a distributed transaction to insert the personal employee information into employee table 126 and the departmental information into department table 128. For example, the new employee's name and home address may be inserted into database system 104 using a first child transaction while the employee's name and assigned department number may be inserted into database system 106 using the second child transaction. Once the changes for the distributed transaction are to be committed, application program 108 coordinates a two-phase commit to cause to the changes to be durably stored in employee table 126 and department table 128.

Because the first and second transaction are part of the same distributed transaction, their corresponding changes must both either be committed or rolled back in nonvolatile memories 114 and 116 respectively. Thus, as part of the two-phase commit sequence, application program 108 is required to durably store participation information in log 124. By durably storing the participation information in log 124, application program 108 guarantees that even if a failure occurs, all changes associated with the distributed transaction will either be committed or rolled back.

However, a drawback to performing a two-phase commit in this manner is that application program 108 must durably store information in nonvolatile memory during the two-phase commit sequence. Typically, the storage of this information is a time consuming process. Thus, the committing of the changes for the distributed transaction is not only delayed by the time that is required to write redo information in logs 118 and 120, but also by the time that is required to write participant information in log 124. For many systems, such as systems in which distributed transactions are continually being processed, there is need to reduce the amount of time that is required for committing a distributed transaction ("commit latency").

One method of reducing the commit latency, as well as the administrative overhead of managing the application program log, is to have a database system, one that is itself currently committing changes for the distributed transaction, act as the coordinator for the two-phase commit sequence. For example, FIG. 1B illustrates a distributed computer system 150 in which database system 104 coordinates all two-phase commit sequences that are required for distributed transactions that are initiated through application program 108, and which require changes to be performed at both database systems 104 and 106.

For example, to add information about a new employee, as previously described for FIG. 1A, application program 108 communicates the new employee information to database system 104. In general, changes that are associated with a different database system typically include a connection qualifier that indicates the database system for which the changes are to be made. For example, changes for department table 128 will typically include a connection qualifier that indicate department table 128 is stored in database system 106. In certain systems, such as Oracle database systems, these connection qualifiers are called database links. Other types of database systems that support distributed transactions provide similar mechanisms to identify and access remote tables.

In this example, when database server 110 detects that one of the changes is to a table in database system 116, database server 110 creates a second child transaction for database server 112. Database system 104 then forwards the modifications to database system 106 for storing in department table 128.

Once the changes specified in the first child transaction have been made to employee table 126, and the changes specified in the second child transaction have been made to department table 128, the distributed transaction is ready to commit. Database system 104 then coordinates a two-phase commit to cause the changes to be durably stored in employee table 126 and department table 128.

Because a separate application program is not used to coordinate the two-phase commit, the committing of the changes is not delayed by the time that is normally required for an application program to durably store redo information in a log. Thus, relative to a system that requires an application program to coordinate the two-phase commits, the commit latency of systems in which one of the participating database systems coordinates the two-phase commit is reduced as fewer logs must be generated and durably stored before committing the distributed transaction.

However, because all communications between application program 108 and database system 106 are required to travel through database system 104, the access time for data residing on database system 106 may be significantly increased. Thus in certain cases, the actual time that is required to complete the changes for a distributed transaction coordinated by one of the resource managers involved in the distributed transaction may actually be increased relative to systems in which the distributed transaction is coordinated by the application itself.

Based on the foregoing, there is a need to provide a mechanism that can reduce the amount of commit latency incurred when an application coordinates its own distributed transaction, but which does not increase the data access times.

SUMMARY OF THE INVENTION

The foregoing needs, and other needs and objects that will become apparent from the following description, are achieved in the present invention, which comprises, in one aspect, a method for using a resource manager to coordinate the committing of a distributed transactions, the method comprising the computer-implemented steps of communicating a first set of changes to a first resource manager. These first set of changes are directly communicated to the first resource manager without being received at a second resource manager. Communicating a second set of changes to the second resource manager. These second set of changes are directly communicated to the second resource manager without being received at the first resource manager. Selecting either the first resource manager or the second resource manager as a committing coordinator. Transmitting a commit request message to the committing coordinator to request that the first set of changes be committed at the first resource manager and that the second set of changes be committed at the second resource manager. In response to receiving the commit request message, the committing coordinator causes, as an atomic unit of work, the first set of changes to be committed at the first resource manager and the second set of changes to be committed at the second resource manager.

According to another feature of the invention, the distributed transaction includes a first and second child transaction. The first set of changes are communicated to the first resource manager by transmitting the first child transaction to the first resource manager and the second set of changes are communicated to the second resource manager by transmitting the second child transaction to the second resource manager.

In yet another feature, the first set of changes and the second set of changes are committed as an atomic unit of work by performing a two-phase commit between the first resource manager and the second resource manager.

In still another feature, the first resource manager uses a first protocol to communicate with other components while the second resource manager uses a second protocol to communicate with other components. To cause the first set of changes and the second set of changes to be committed as an atomic unit of work, the first resource manager and the second resource manager communicate with each other through the use of a gateway device.

The invention also encompasses a computer-readable medium, a computer system, and a computer data signal embodied in a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a distributed database system for which distributed transactions can be performed;

FIG. 1B is a block diagram that illustrates another distributed computer system for which distributed transactions can be performed;

DETAILED DESCRIPTION OF THE PREFERRED EMBODIMENT

A method and apparatus for processing distributed transactions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 2:
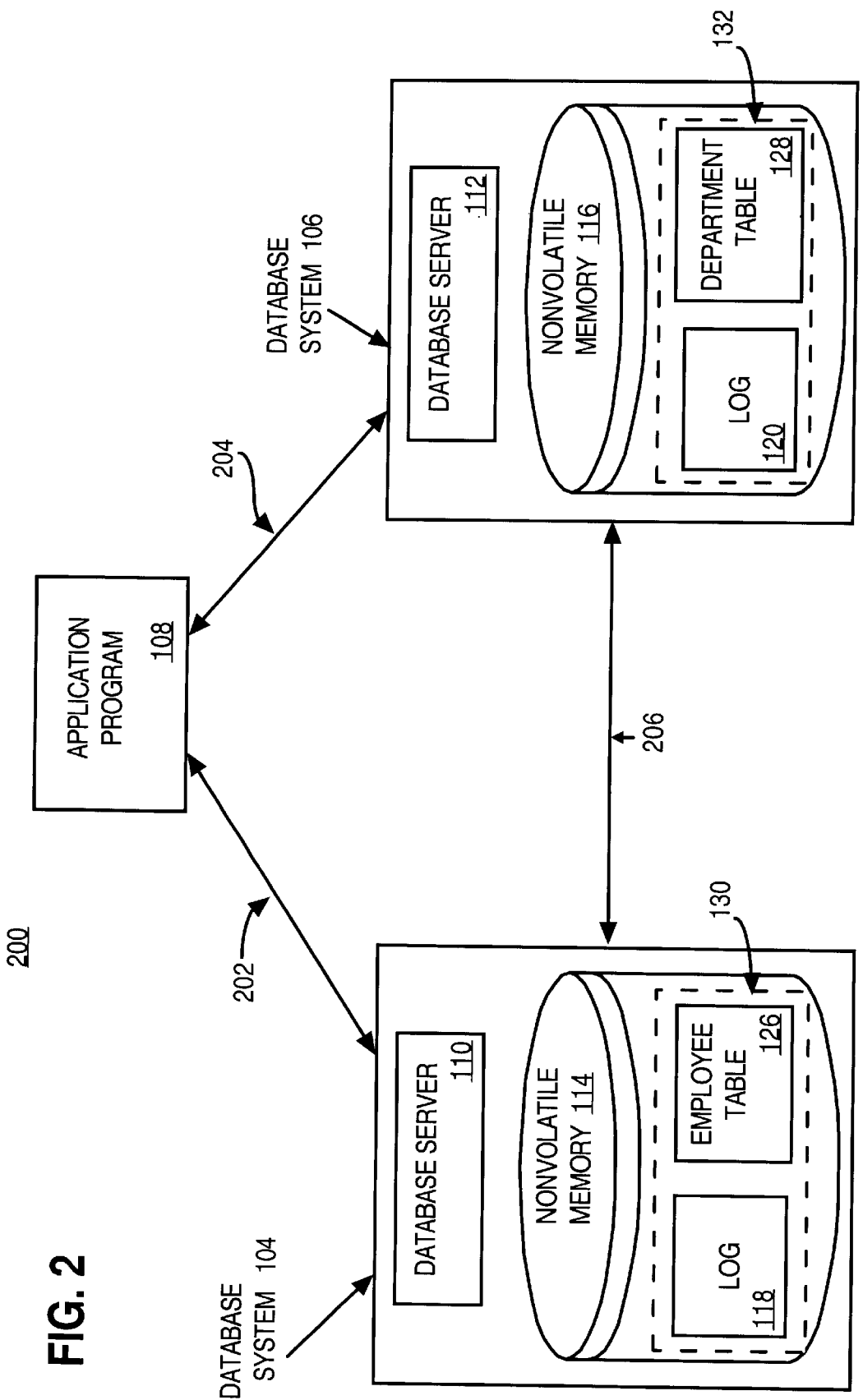
FIG. 2 is a block diagram of a computer system architecture in which the present invention may be utilized.

FIG. 2 is a block diagram of a distributed computer system 200 in which the invention can be used. Generally, the distributed computer system 200 includes an application program 108 and a plurality of database systems 104 and 106. Application program 108 represents one or more processes that provides an interface for accessing and manipulating information that resides on in database systems 104 and 106. Although not shown, application program 108 may reside on a single computers system, such as a laptop computer, a personal computer (PC), a work station, or any other group of hardware or software components or processes that cooperate or execute in one or more computer systems.

Database systems 104 and 106 represent resource management systems that manage a particular set of information. For example, database systems 104 and 106 may be database systems that are available from Oracle Corporation of Redwood Shores Calif. In certain embodiments, application program 108 functions as a client such that a client-server relationship exists between application program 108 and database systems 104 and 106.

Communication links 202 and 204 are communication links through which application program 108 communicates with database systems 104 and 106. For example, in certain embodiments, application program 108 communicates with database systems 104 and 106 over links 202 and 204 using the Oracle Call Interface (OCI) protocol. However, embodiments of the invention are not limited to any particular interface protocol but instead are typically determined by the type of database system with which the application program 108 is communicating.

Also depicted in FIG. 2 a communication link 206 that provides a mechanism for communicating between the database systems 104 and 106. Using communication link 206, database system 104 or database system 106 may coordinate the committing of a distributed transaction that includes changes made in both database systems 104 and 106. For explanation purposes only, embodiments of the invention shall be described in which database system 104 acts as the coordinating system.

In one embodiment, the X/OPEN protocol interface is used for communicating information between database systems 104 and 106. However, embodiments of the invention are not limited to any particular interface protocol. For example, the Common Object Request Broker Architecture ("CORBA") Object Transaction Service specification or the Javasoft Java Transaction Service specification can also be used to communicate between heterogeneous systems.

Routines that implement the techniques described herein for processing distributed transactions were included on a CD ROM that also contained Oracle8™ Server Software. Although resident on the CD ROM, the Oracle8™ Server Software contained no hooks to call the routines, nor was any mechanism provided that would allow a user to execute them or know of their existence. Thus, the existence of the routines was unknown to and unknowable by the users of the software. Oracle8™ Server Software first shipped on Jun. 24, 1997.

Functional Overview

An application program communicates directly with a particular set of resource mangers to request that changes be made. In one embodiment, the application program uses a distributed transaction to communicate the change requests to the resource managers. The changes may be communicated in parallel or in series to the resource managers. Once the changes are to be committed a resource manager that has been selected as the coordinator, coordinates the committing of the changes as an atomic unit of work. In certain embodiments, in performing the steps, a client-server relationship is maintained between the application program and the resource mangers.

Figure 3:
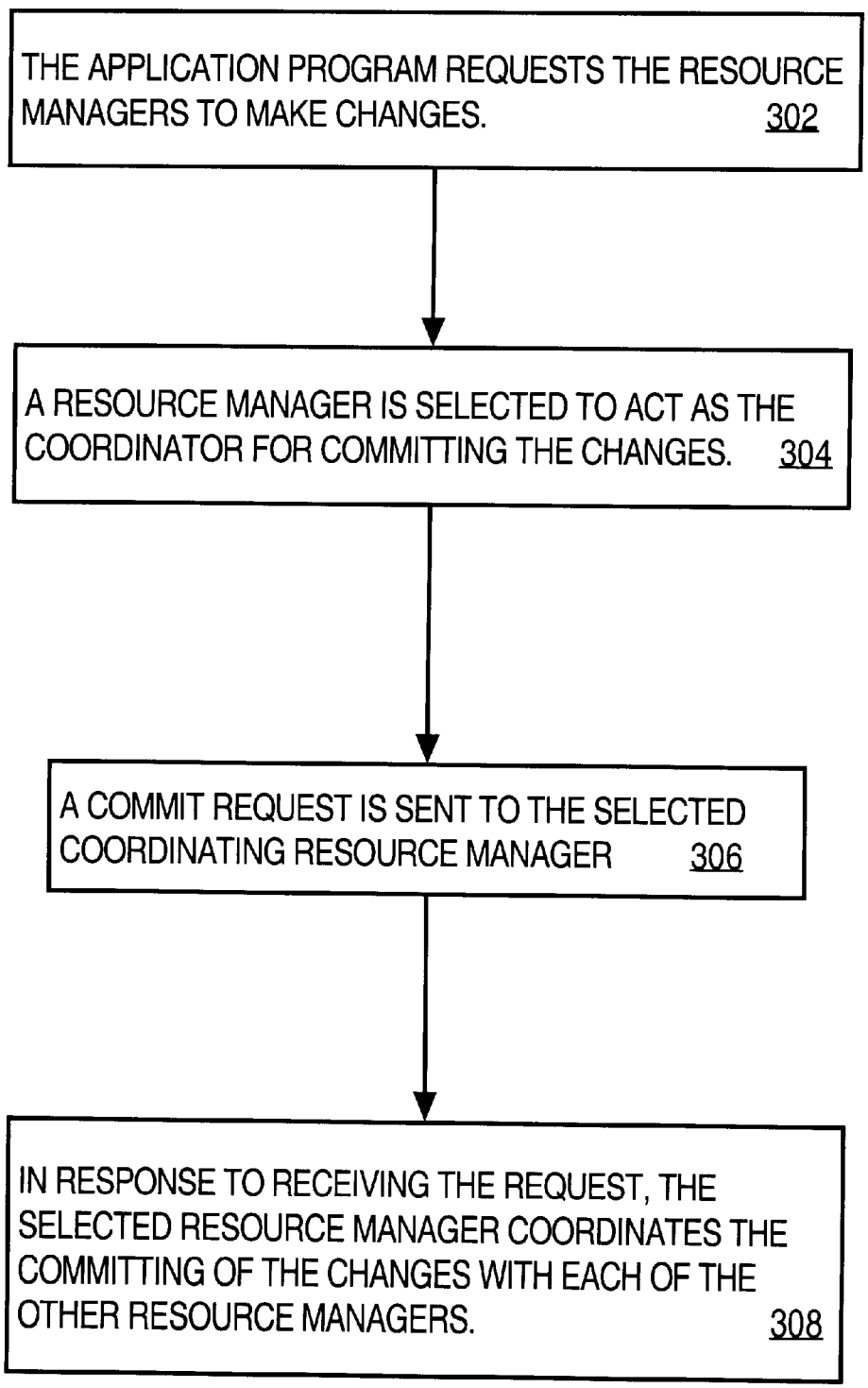
FIG. 3 is a flow diagram that illustrates steps involved in a method for committing a distributed transaction according to certain embodiments of the invention.

FIG. 3 illustrates a flow diagram for committing a distributed transaction according to certain embodiments of the invention. For explanation purposes, the components of FIG. 2 are used in describing the steps of FIG. 3.

At step 302, the application program 108 requests the resource managers to make one or more changes in their respective databases. For example, as part of a distributed transaction, application program 108 may request database systems 104 and 106 to respectively make changes in databases 130 and 132. The distributed transaction may include a first child transaction that includes changes that need to be made to employee table 126 of database system 104 and a second child transaction that includes changes that need to be made to department table 128 of database system 106. In one embodiment, a separate "communication" process is initiated at each of the database systems 104 and 106. Each communication process controls the communication of the transaction between the application program 108 and the particular database system. For explanation purposes it shall be assumed that a communication process "PID1" is used to handle the communication between application program 108 and database system 104 while a communication process "PID2" is used to handle the communication between application program 108 and database system 106. Upon receiving the change requests from application program 108, database systems 104 and 106 respectively perform the requested changes without making the changes permanent.

At step 304, the application program selects a particular resource manager to act as the committing coordinator for committing the changes. Several techniques may be used to select the particular resource manager. For example, the resource manager that is believed to have the most number of changes that need to be committed can be selected as the committing coordinator. Alternatively, a particular database system may be used as the default committing coordinator. Thus, embodiments of the invention are not limited to particular method for determining which resource manager is to be selected as the committing coordinator.

At step 306, the application program sends a commit request message to the committing coordinator. In one embodiment, the application program includes within the commit request message "transaction identification information" that identifies a particular child transaction that needs to be committed. For example, the commit request may include such transaction identification information as "XID1, database system 104" and "XID2, database system 106". In this example, XID1 identifies a child transaction for database system 104 and XID2 identifies a child transaction for database system 106.

In another embodiment, the application program may include "process identification information" within the commit request message that identifies the particular process the application program used in communicating the change information to each of the database systems. For example, the commit request may include such process identification information as "PID1, database system 104" and "PID2, database system 106".

At step 308, the committing coordinator coordinates the committing of the changes as an atomic unit of work. In one embodiment, the committing coordinator performs a two-phase commit to commit the changes at each of the corresponding resource managers. To commit the changes for a particular resource manager, a communication link is established the committing coordinator and the other resource manager. As part of establishing the communication link between the committing coordinator and the other resource manager, a "committing" process is initiated by both the committing coordinator and the other resource manager. These committing processes are used to coordinate the committing of the changes that are associated with the distributed transaction.

In certain embodiments, communication links may be reused for committing subsequent transactions. By reusing previously established communication links, the overhead associated with establishing a link for each transaction that is to be committed can be eliminated.

By assigning a database system as the committing coordinator, a mechanism is provided that eliminates the need to maintain a log file at the application program, or at a separate tp-monitor, as the application program or tp-monitor are no longer required to store participation information for coordinating the committing of distributed transaction. By reducing the number of log files a reduction in the commit latency is achieved. In addition, by maintaining a direct communication link with each resource manager, the described mechanism does not increase the data access times when communicating changes between the application program and the resource managers.

Transferring Control of the Communication Processes

Figure 4:
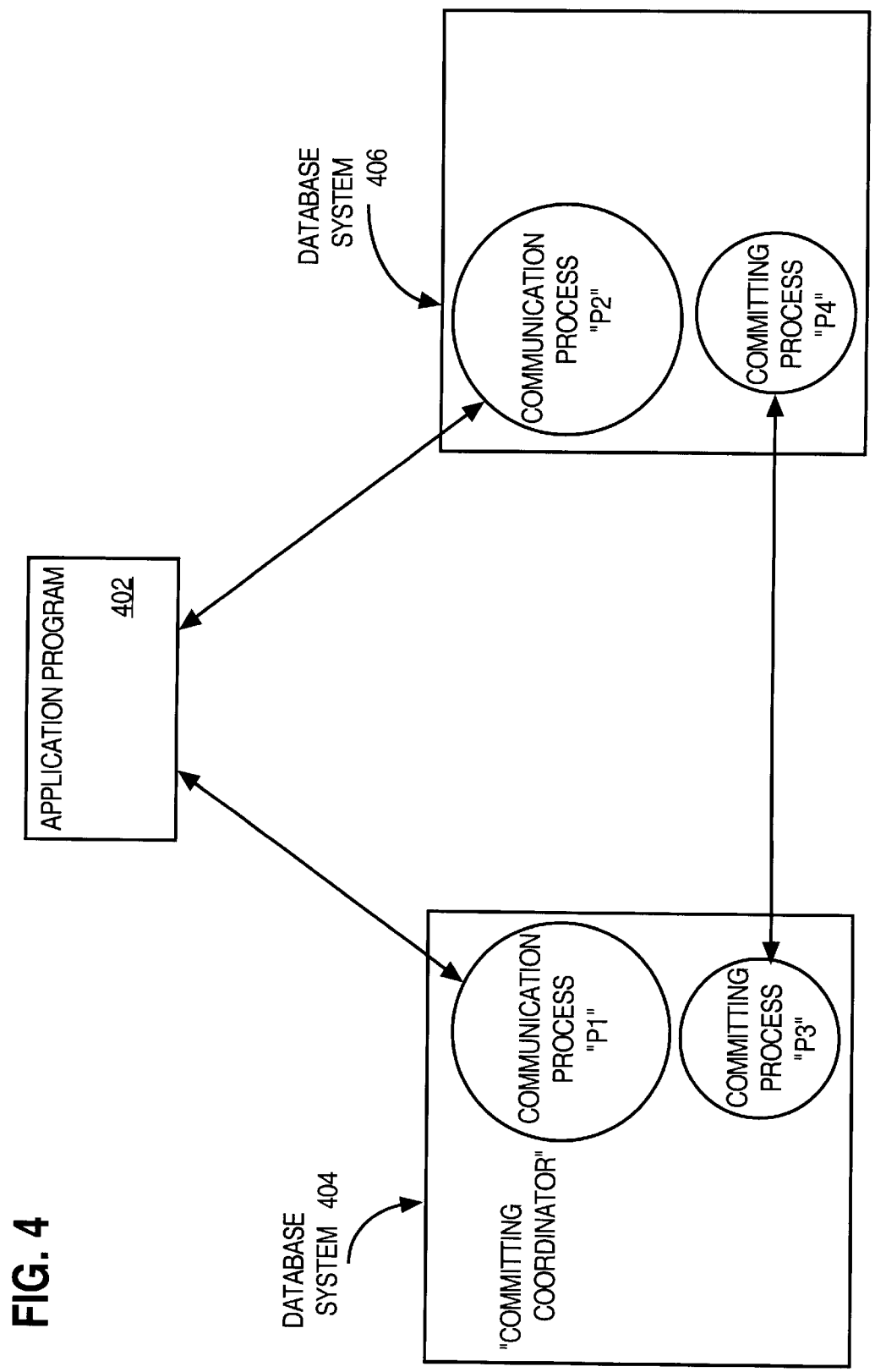
FIG. 4 illustrates a block diagram depicting certain processes that may be used for communicating between components of the distributed computer system according to certain embodiments of the invention.

In certain embodiments, to allow the committing coordinator to coordinate the committing of the changes at the other database systems, a mechanism is provided to allow the committing process of a particular database system to inherit the transaction state of the communication process of the particular database system. For example, FIG. 4 illustrates a block diagram depicting certain processes that may be used for communicating between components of the distributed computer system according to certain embodiments of the invention. In this example, it is assumed that database system 404 has been selected as the coordinator. It is also assumed that changes of a distributed transaction have been communicated to database system 404 through a first child transaction and that changes of the distributed transaction have been communicated to database system 406 through a second child transaction.

As illustrated in FIG. 4, application program 402 communicates change information with database system 404 through communication process "P1". In a similar manner application program 402 communicates change information with database system 406 through communication process "P2". In this example, communication process "P1" maintains transaction state information for the child transaction that is used to communicate the distributed transaction changes for database system 404. Likewise, communication process "P2" maintains transaction state information for the child transaction that is used to communicate the distributed transaction changes for database system 406.

Alternatively, committing process "P3" and committing process "P4" have been initiated by database system 404 and database system 406 to communicate the committing sequence for the changes of the distributed transaction. In one embodiment, before committing process "P4" can participate in the committing sequence, communication process "P2" must first transfer control of its transaction to committing process "P4". For example, before committing process "P4" can participate in the committing sequence, communication processes "P2" must first transfer control of the second child transaction to committing process "P4". In certain embodiments, communication processes "P2" and committing process "P4" use a shared area of memory to communicate values for transferring the control of transaction between the two processes.

Figure 5:
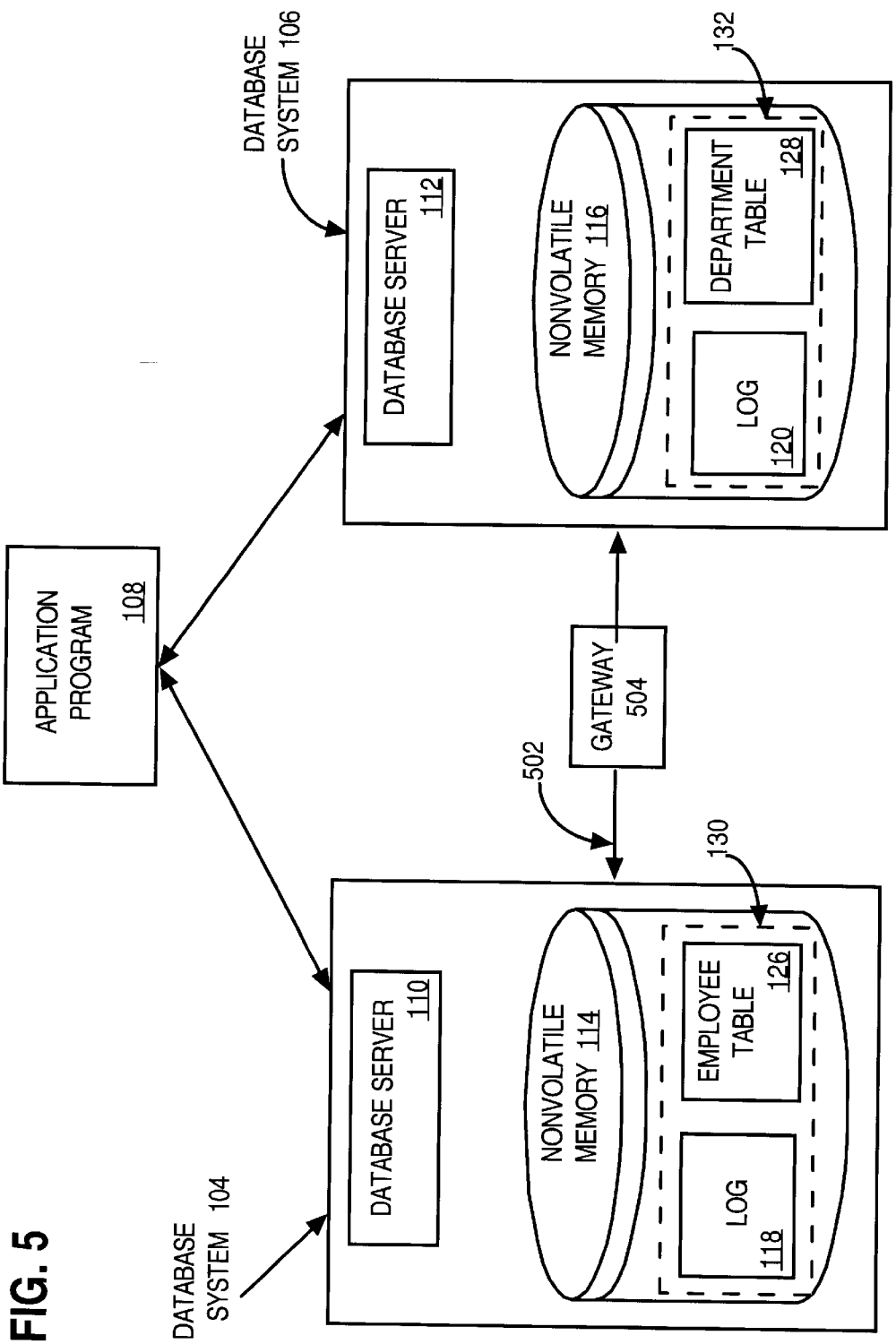
FIG. 5 illustrates a block diagram in which a distributed transaction can be committed in a heterogeneous distributed database system in accordance with certain embodiments of the invention.

In certain embodiments, the committing coordinator uses a single process to both communicate with the application program and to coordinate the committing of the distributed transaction. Thus, the committing process of the coordinator is not required to inherit the transaction state as the committing process and the communication process are one and the same. Committing a Distributed Transaction in Heterogeneous Systems Although the previous examples have depicted the committing of a distributed transaction in a homogeneous distributed database system, in certain embodiments, a distributed transaction may be committed in a heterogeneous distributed database system. FIG. 5 illustrates a block diagram in which a distributed transaction can be committed in a heterogeneous distributed database system in accordance with certain embodiments of the invention. In this example, a gateway device 504 is used to communicate between two distinct types of database systems. Gateway devices are well known in the art and are generally used to allow communication between two components that typically use distinct protocols in communicating with other components. A method for processing distributed transactions in a heterogeneous computer system using a two-phase commit is described in detail in U.S. patent application Ser. No. 08/796,169, entitled "PROCESSING DISTRIBUTED TRANSACTIONS IN HETEROGENOUS COMPUTING ENVIRONMENTS USING TWO-PHASE COMMIT", filed on Feb. 5, 1997, U.S. Pat. No. 5,924,095, the contents of which is incorporated by reference in its entirety.

For explanation purposes, it is assumed that database system 104 is an Oracle database system and that database system 106 is an IBM DB2 database system. Also for explanation purposes it assumed that database system 104 is selected as the committing coordinator.

As depicted in this example, communication between application program 108 and database system 104 is performed using the OCI protocol while communication between application program 108 and database system 106 is performed using the SQL/DS protocol. Once the changes have been communicated to database systems 104 and 106, application program 108 may send a commit request message to database system 104 requesting that the changes be durably stored in nonvolatile memory. In response to receiving the request, database system 104 communicates with database system 106 through gateway device 504 to commit the changes. In one embodiment, a two-phase commit is performed to make permanent the corresponding changes for database system 104 and 106.

Hardware Overview

Figure 6:
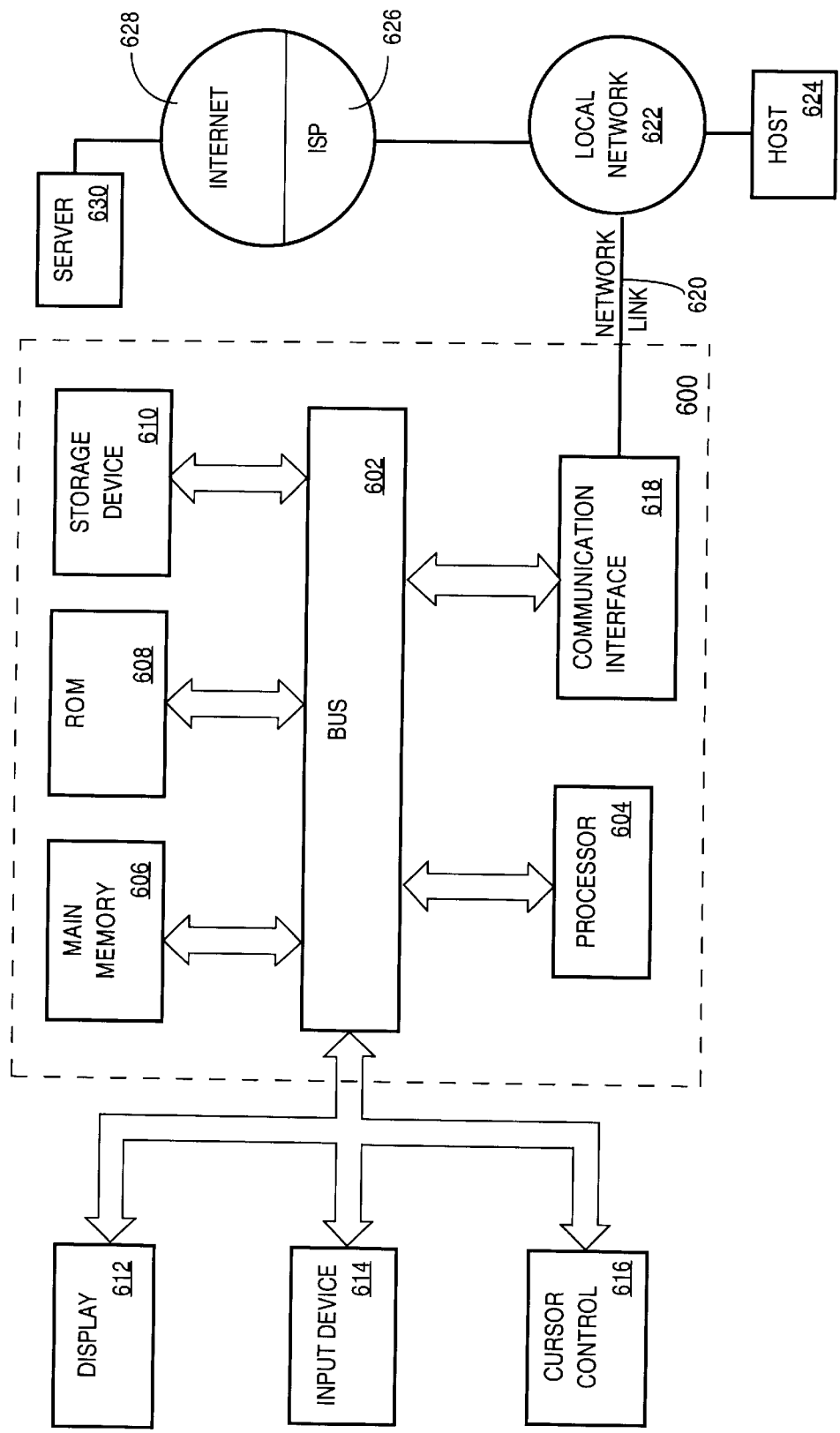
FIG. 6 is a block diagram of a computer system hardware arrangement that can be used to implement aspects of the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for processing distributed transactions in a distributed computer system. According to one embodiment of the invention, the processing of distributed transactions by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for processing distributed transactions in a distributed computer system as described herein.

The received code may be executed by processor 604 as it is received, and/or stored in storage device 610, or other non-volatile storage for later execution. In this manner, computer system 600 may obtain application code in the form of a carrier wave.

Alternatives, Extensions

By eliminating the need for an application program to durably store two-phase commit information during the committing of a distributed transaction initiated by the application, the commit latency can be reduced as fewer writes to nonvolatile memory are required. In addition, by allowing the application program to directly communicate with each of the resource managers, data access times between the program application and the resource managers is not increased relative to a system in which the application program itself coordinates the two-phase commit.

In the foregoing specification, the invention has been described with reference to specific embodiments thereof. It will, however, be evident that various modifications and changes may be made thereto without departing from the broader spirit and scope of the invention. For example, although embodiments of the invention have been described in reference to database systems, the present invention is not limited to any particular type of resource manager. Thus, embodiments of the invention may be practiced using a variety of different resource management systems, including but not limited to queuing systems, file management systems, and database management systems.

In addition, although the examples have illustrated the distributed computer systems having only two database systems (for example database systems 104 and 106), embodiments of the invention are not limited to any particular number of database systems. Thus, the specification and drawings are, accordingly, to be regarded in an illustrative rather than a restrictive sense.

Also, within this disclosure, including the claims, certain process steps are set forth in a particular order, and alphabetic and alphanumeric labels are used to identify certain steps. Thus, unless specifically stated in the disclosure, embodiments of the invention are not limited to any particular order of carrying out such steps. In particular, the labels are used merely for convenient identification of steps, and are not intended to imply, specify or require a particular order of carrying out such steps. For example, referring to FIG. 3, in certain embodiments of the invention, the step of selecting a resource manager to act as a coordinator for committing a distributed transaction (step 304) may actually be performed prior to the application program submitting the changes to the resource managers (step 302).

What is claimed is:

1. A method for processing a distributed transaction in a distributed computer system, the method comprising the steps:

communicating a first set of changes to a first resource manager, wherein the first set of changes is directly communicated to the first resource manager without being received at a second resource manager;

communicating a second set of changes to the second resource manager, wherein the second set of changes is directly communicated to the second resource manager without being received at the first resource manager;

selecting either the first resource manager or the second resource manager as a committing coordinator;

transmitting a commit request message to the committing coordinator to request that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

2. The method of claim 1, wherein:

the distributed transaction comprises a first child transaction and a second child transaction;

the step of communicating the first set of changes to the first resource manager comprises the step of transmitting the first child transaction to the first resource manager; and the step of communicating the second set of changes to the second resource manager comprises the step of transmitting the second child transaction to the second resource manager.

3. The method of claim 1, wherein the first resource manager and the second resource manager are homogeneous resource managers.

4. The method of claim 1, wherein the first resource manager and the second resource manager are heterogeneous resource managers.

5. The method of claim 1, wherein the step of causing the first set of changes and the second set of changes to be committed as an atomic unit of work includes the step of causing a two-phase commit to be performed between the first resource manager and the second resource manager.

6. The method of claim 1, wherein:

the first resource manager uses a first protocol to communicate with other components;

the second resource manager uses a second protocol to communicate with other components; and the step of causing the first set of changes and the second set of changes to be committed as an atomic unit of work includes the step of the first resource manager and the second resource manager communicating with each other through the use of a gateway device.

7. The method of claim 1, wherein:

the step of communicating the first set of changes includes the step of communicating the first set of changes to a first database system;

the step of communicating the second set of changes includes the step of communicating the second set of changes to a second database system;

the step of selecting either the first resource manager or the second resource manager as the committing coordinator includes the step of selecting either the first database system or the second database system as the committing coordinator;

the step of transmitting the commit request message includes the step of transmitting the commit request message to the committing coordinator to request that the first set of changes be committed at the first database system and that the second set of changes be committed at the second database system; and the step of said committing coordinator includes the step of said committing coordinator causing, as an atomic unit of work, the first set of changes to be committed at the first database system and the second set of changes to be committed at the second database system.

8. The method of claim 1, wherein the step of causing the first set of changes and the second set of changes to be committed as an atomic unit of work includes the steps of:

storing a first set of log information in nonvolatile memory at the first resource manager, wherein the first set of log information corresponds to the first set of changes written into nonvolatile memory at the first resource manager; and storing a second set of log information in nonvolatile memory at the second resource manager, wherein the second set of log information corresponds to the second set of changes written into nonvolatile memory at the second resource manager.

9. The method of claim 1, wherein the step of said committing coordinator causing the first set of changes and the second set of changes to be committed as an atomic unit of work includes the step of storing redo information in nonvolatile memory at the committing coordinator, wherein the redo information guarantees that even if the committing coordinator fails, the first set of changes and the second set of changes will atomically be either committed or rollback by both the first and second resource managers.

10. The method of claim 1, wherein the first set of changes and the second set of changes are communicated in parallel respectively to the first resource manager and second resource manager.

11. The method of claim 1, wherein the first set of changes and the second set of changes are communicated in series respectively to the first resource manager and second resource manager.

12. A method for processing a distributed transaction in a distributed computer system, the method comprising the steps:

identifying a plurality of resource managers at which changes are to be made;

communicating to each of the plurality of resource managers a particular group of changes, wherein the particular group of changes are communicated directly to each of the plurality of resource managers without being received at a different resource manager;

selecting one of the plurality of resource managers as a committing coordinator;

transmitting a commit request message to the selected committing coordinator to request that each group of changes be committed for each of the plurality of resource managers for which the group of changes were communicated; and in response to receiving the commit request message, said committing coordinator causing, as an atomic unit of work, each group of changes to be committed at each of the plurality of resource managers for which the group of changes were communicated.

13. A computer-readable medium carrying one or more sequences of one or more instructions for processing a distributed transaction in a distributed computer system, the one or more sequences of one or more instructions including instructions which, when executed by one or more processors, cause the one or more processors to perform the steps of:

communicating a first set of changes to a first resource manager, wherein the first set of changes is directly communicated to the first resource manager without being received at a second resource manager;

communicating a second set of changes to the second resource manager, wherein the second set of changes is directly communicated to the second resource manager without being received at the first resource manager;

selecting either the first resource manager or the second resource manager as a committing coordinator;

transmitting a commit request message to the committing coordinator to request that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

14. The computer-readable medium of claim 13, wherein:
the distributed transaction comprises a first child transaction and a second child transaction;
the step of communicating the first set of changes to the first resource manager comprises the step of transmitting the first child transaction to the first resource manager; and
the step of communicating the second set of changes to the second resource manager comprises the step of transmitting the second child transaction to the second resource manager.

15. The computer-readable medium of claim 13, wherein the first resource manager and the second resource manager are homogeneous resource managers.

16. The computer-readable medium of claim 13, wherein the first resource manager and the second resource manager are heterogeneous resource managers.

17. The computer-readable medium of claim 13, wherein the step of causing the first set of changes and the second set of changes to be committed as an atomic unit of work includes the step of causing a two-phase commit to be performed between the first resource manager and the second resource manager.

18. The computer-readable medium of claim 13, wherein:
the first resource manager uses a first protocol to communicate with other components;
the second resource manager uses a second protocol to communicate with other components; and
the step of causing the first set of changes and the second set of changes to be committed as an atomic unit of work includes the step of the first resource manager and the second resource manager communicating with each other through the use of a gateway device.

19. The computer-readable medium of claim 13, wherein:
the step of communicating the first set of changes includes the step of communicating the first set of changes to a first database system;
the step of communicating the second set of changes includes the step of communicating the second set of changes to a second database system;
the step of selecting either the first resource manager or the second resource manager as the committing coordinator includes the step of selecting either the first database system or the second database system as the committing coordinator;
the step of transmitting the commit request message includes the step of transmitting the commit request message to the committing coordinator to request that the first set of changes be committed at the first database system and that the second set of changes be committed at the second database system; and
the step of said committing coordinator includes the step of said committing coordinator causing, as an atomic unit of work, the first set of changes to be committed at the first database system and the second set of changes to be committed at the second database system.

20. The computer-readable medium of claim 13, wherein the step of causing the first set of changes and the second set of changes to be committed as an atomic unit of work includes the steps of:
storing a first set of log information in nonvolatile memory at the first resource manager, wherein the first set of log information corresponds to the first set of changes written into nonvolatile memory at the first resource manager; and
storing a second set of log information in nonvolatile memory at the second resource manager, wherein the second set of log information corresponds to the second set of changes written into nonvolatile memory at the second resource manager.

21. The computer-readable medium of claim 13, wherein the step of said committing coordinator causing the first set of changes and the second set of changes to be committed as an atomic unit of work includes the step of storing redo information in nonvolatile memory at the committing coordinator, wherein the redo information guarantees that even if the committing coordinator fails, the first set of changes and the second set of changes will atomically be either committed or rollback by both the first and second resource managers.

22. The computer-readable medium of claim 13, wherein the first set of changes and the second set of changes are communicated in parallel respectively to the first resource manager and second resource manager.

23. The computer-readable medium of claim 13, wherein the first set of changes and the second set of changes are communicated in series respectively to the first resource manager and second resource manager.

24. A computer data signal embodied in a carrier wave, the computer data signal carrying one or more sequences of instructions for processing a distributed transaction in a distributed computer system, wherein execution of the one or more sequences of instructions by one or more processors causes the one or more processors to perform the steps of:
communicating a first set of changes to a first resource manager, wherein the first set of changes is directly communicated to the first resource manager without being received at a second resource manager;
communicating a second set of changes to the second resource manager, wherein the second set of changes is directly communicated to the second resource manager without being received at the first resource manager;
selecting either the first resource manager or the second resource manager as a committing coordinator;
transmitting a commit request message to the committing coordinator to request that the first set of changes be committed at the first resource manager and that the second set of changes be committed at the second resource manager; and
in response to receiving the commit request message, said committing coordinator causing, as an atomic unit of work, the first set of changes to be committed at the first resource manager and the second set of changes to be committed at the second resource manager.

25. A computer system for processing a distributed transaction in a distributed computer system, the computer system comprising:
a first resource manager;
a second resource manager; and
an application program, wherein the application program,
communicates a first set of changes to the first resource manager, wherein the first set of changes is directly communicated to the first resource manager without being received at the second resource manager;
communicates a second set of changes to the second resource manager, wherein the second set of changes is directly communicated to the second resource manager without being received at the first resource manager;
selects either the first resource manager or the second resource manager as a committing coordinator;

transmits a commit request message to the committing coordinator to request that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

26. A method for processing a distributed transaction in a distributed computer system, the method comprising the steps:

communicating a first set of changes to a first resource manager, wherein the first set of changes is directly communicated to the first resource manager without being received at a second resource manager;

communicating a second set of changes to the second resource manager, wherein the second set of changes is directly communicated to the second resource manager without being received at the first resource manager;

selecting either the first resource manager or the second resource manager as a committing coordinator;

transmitting a commit request message to the committing coordinator to cause said committing coordinator to coordinate, as an atomic unit of work, the first set of changes to be committed at the first resource manager and the second set of changes to be committed at the second resource manager.

27. The method of claim 26, wherein the first resource manager and the second resource manager are homogeneous resource managers.

28. The method of claim 26, wherein the first resource manager and the second resource manager are heterogeneous resource managers.

29. The method of claim 26, wherein:

the step of communicating the first set of changes includes the step of communicating the first set of changes to a first database system;

the step of communicating the second set of changes includes the step of communicating the second set of changes to a second database system;

the step of selecting either the first resource manager or the second resource manager as the committing coordinator includes the step of selecting either the first database system or the second database system as the committing coordinator; and the step of transmitting the commit request message includes the step of transmitting the commit request message to the committing coordinator to request that the first set of changes be committed at the first database system and that the second set of changes be committed at the second database system.

30. The method of claim 26, wherein the first set of changes and the second set of changes are communicated in parallel respectively to the first resource manager and second resource manager.

31. The method of claim 26, wherein the first set of changes and the second set of changes are communicated in series respectively to the first resource manager and second resource manager.

32. A method for processing a distributed transaction in a distributed computer system, the method comprising the steps:

receiving a first set of changes at a first resource manager, wherein the first set of changes is directly received by the first resource manager without being received at a second resource manager;

receiving a second set of changes at a second resource manager, wherein the second set of changes is directly received by the second resource manager without being received at the first resource manager;

receiving a message that identifies either the first resource manager or the second resource manager as a committing coordinator;

receiving a commit request message at the committing coordinator requesting that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

33. The method of claim 32, wherein the first resource manager and the second resource manager are homogeneous resource managers.

34. The method of claim 32, wherein the first resource manager and the second resource manager are heterogeneous resource managers.

35. The method of claim 32, wherein the step of causing the first set of changes and the second set of changes to be committed as an atomic unit of work includes the step of causing a two-phase commit to be performed between the first resource manager and the second resource manager.

36. The method of claim 32, wherein:

the first resource manager uses a first protocol to communicate with other components;

the second resource manager uses a second protocol to communicate with other components; and the step of causing the first set of changes and the second set of changes to be committed as an atomic unit of work includes the step of the first resource manager and the second resource manager communicating with each other through the use of a gateway device.

37. The method of claim 32, wherein the step of causing the first set of changes and the second set of changes to be committed as an atomic unit of work includes the steps of:

storing a first set of log information in nonvolatile memory at the first resource manager, wherein the first set of log information corresponds to the first set of changes written into nonvolatile memory at the first resource manager; and storing a second set of log information in nonvolatile memory at the second resource manager, wherein the second set of log information corresponds to the second set of changes written into nonvolatile memory at the second resource manager.

38. The method of claim 32, wherein the step of said committing coordinator causing the first set of changes and the second set of changes to be committed as an atomic unit of work includes the step of storing redo information in nonvolatile memory at the committing coordinator, wherein the redo information guarantees that even if the committing coordinator fails, the first set of changes and the second set of changes will atomically be either committed or rollback by both the first and second resource managers.

39. A computer-readable medium for processing a distributed transaction in a distributed computer system, the computer-readable medium carrying one or more sequences or one or more instructions which, when executed by one or more processors, cause the one or more processors to perform the steps of:

identifying a plurality of resource managers at which changes are to be made;

communicating to each of the plurality of resource managers a particular group of changes, wherein the particular group of changes are communicated directly to each of the plurality of resource managers without being received at a different resource manager;

selecting one of the plurality of resource managers as a committing coordinator;

transmitting a commit request message to the selected committing coordinator to request that each group of changes be committed for each of the plurality of resource managers for which the group of changes were communicated; and in response to receiving the commit request message, said committing coordinator causing, as an atomic unit of work, each group of changes to be committed at each of the plurality of resource managers for which the group of changes were communicated.

40. A computer system for processing a distributed transaction in a distributed computer system, the computer system comprising a memory with one or more sequences or one or more instructions which, when executed by one or more processors, cause the one or more processors to perform the steps of:

identifying a plurality of resource managers at which changes are to be made;

communicating to each of the plurality of resource managers a particular group of changes, wherein the particular group of changes are communicated directly to each of the plurality of resource managers without being received at a different resource manager;

selecting one of the plurality of resource managers as a committing coordinator;

transmitting a commit request message to the selected committing coordinator to request that each group of changes be committed for each of the plurality of resource managers for which the group of changes were communicated; and in response to receiving the commit request message, said committing coordinator causing, as an atomic unit of work, each group of changes to be committed at each of the plurality of resource managers for which the group of changes were communicated.

41. A computer-readable medium for processing a distributed transaction in a distributed computer system, the computer-readable medium carrying one or more sequences or one or more instructions which, when executed by one or more processors, cause the one or more processors to perform the steps of:

communicating a first set of changes to a first resource manager, wherein the first set of changes is directly communicated to the first resource manager without being received at a second resource manager;

communicating a second set of changes to the second resource manager, wherein the second set of changes is directly communicated to the second resource manager without being received at the first resource manager;

selecting either the first resource manager or the second resource manager as a committing coordinator; and transmitting a commit request message to the committing coordinator to cause said committing coordinator to coordinate, as an atomic unit of work, the first set of changes to be committed at the first resource manager and the second set of changes to be committed at the second resource manager.

42. The computer-readable medium of claim 41, wherein the first resource manager and the second resource manager are homogeneous resource managers.

43. The computer-readable medium of claim 41, wherein the first resource manager and the second resource manager are heterogeneous resource managers.

44. The computer-readable medium of claim 41, wherein:

the step of communicating the first set of changes includes the step of communicating the first set of changes to a first database system;

the step of communicating the second set of changes includes the step of communicating the second set of changes to a second database system;

the step of selecting either the first resource manager or the second resource manager as the committing coordinator includes the step of selecting either the first database system or the second database system as the committing coordinator; and the step of transmitting the commit request message includes the step of transmitting the commit request message to the committing coordinator to request that the first set of changes be committed at the first database system and that the second set of changes be committed at the second database system.

45. The computer-readable medium of claim 41, wherein the first set of changes and the second set of changes are communicated in parallel respectively to the first resource manager and second resource manager.

46. The computer-readable medium of claim 41, wherein the first set of changes and the second set of changes are communicated in series respectively to the first resource manager and second resource manager.

47. A computer system for processing a distributed transaction in a distributed computer system, the computer system comprising a memory with one or more sequences or one or more instructions which, when executed by one or more processors, cause the one or more processors to perform the steps of:

communicating a first set of changes to a first resource manager, wherein the first set of changes is directly communicated to the first resource manager without being received at a second resource manager;

communicating a second set of changes to the second resource manager, wherein the second set of changes is directly communicated to the second resource manager without being received at the first resource manager;

selecting either the first resource manager or the second resource manager as a committing coordinator; and transmitting a commit request message to the committing coordinator to cause said committing coordinator to coordinate, as an atomic unit of work, the first set of changes to be committed at the first resource manager and the second set of changes to be committed at the second resource manager.

48. The computer system of claim 47, wherein the first resource manager and the second resource manager are homogeneous resource managers.

49. The computer system of claim 47, wherein the first resource manager and the second resource manager are resource managers.

50. The computer system of claim 47, wherein:

the step of communicating the first set of changes includes the step of communicating the first set of changes to a first database system;

the step of communicating the second set of changes includes the step of communicating the second set of changes to a second database system;

the step of selecting either the first resource manager or the second resource manager as the committing coordinator includes the step of selecting either the first database system or the second database system as the committing coordinator; and the step of transmitting the commit request message includes the step of transmitting the commit request message to the committing coordinator to request that the first set of changes be committed at the first database system and that the second set of changes be committed at the second database system.

51. The computer system of claim 47, wherein the first set of changes and the second set of changes are communicated in parallel respectively to the first resource manager and second resource manager.

52. The computer system of claim 47, wherein the first set of changes and the second set of changes are communicated in series respectively to the first resource manager and second resource manager.

53. A computer-readable medium for processing a distributed transaction in a distributed computer system, the computer-readable medium carrying one or more sequences or one or more instructions which, when executed by one or more processors, cause the one or more processors to perform the steps of:

receiving a first set of changes at a first resource manager, wherein the first set of changes is directly received by the first resource manager without being received at a second resource manager;

receiving a second set of changes at a second resource manager, wherein the second set of changes is directly received by the second resource manager without being received at the first resource manager;

receiving a message that identifies either the first resource manager or the second resource manager as a committing coordinator;

receiving a commit request message at the committing coordinator requesting that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

54. The computer-readable medium of claim 53, wherein the first resource manager and the second resource manager are homogeneous resource managers.

55. The computer-readable medium of claim 53, wherein the first resource manager and the second resource manager are heterogeneous resource managers.

56. The computer-readable medium of claim 53, wherein the step of causing the first set of changes and the second set of changes to be committed as an atomic unit of work includes the step of causing a two-phase commit to be performed between the first resource manager and the second resource manager.

57. The computer-readable medium of claim 53, wherein:

the first resource manager uses a first protocol to communicate with other components;

the second resource manager uses a second protocol to communicate with other components; and the step of causing the first set of changes and the second set of changes to be committed as an atomic unit of work includes the step of the first resource manager and the second resource manager communicating with each other through the use of a gateway device.

58. The computer-readable medium of claim 53, wherein the step of causing the first set of changes and the second set of changes to be committed as an atomic unit of work includes the steps of:

storing a first set of log information in nonvolatile memory at the first resource manager, wherein the first set of log information corresponds to the first set of changes written into nonvolatile memory at the first resource manager; and storing a second set of log information in nonvolatile memory at the second resource manager, wherein the second set of log information corresponds to the second set of changes written into nonvolatile memory at the second resource manager.

59. The computer-readable medium of claim 53, wherein the step of said committing coordinator causing the first set of changes and the second set of changes to be committed as an atomic unit of work includes the step of storing redo information in nonvolatile memory at the committing coordinator, wherein the redo information guarantees that even if the committing coordinator fails, the first set of changes and the second set of changes will atomically be either committed or rollback by both the first and second resource managers.

60. A computer system for processing a distributed transaction in a distributed computer system, the computer system comprising a memory with one or more sequences or one or more instructions which, when executed by one or more processors, cause the one or more processors to perform the steps of:

receiving a first set of changes at a first resource manager, wherein the first set of changes is directly received by the first resource manager without being received at a second resource manager;

receiving a second set of changes at a second resource manager, wherein the second set of changes is directly received by the second resource manager without being received at the first resource manager;

receiving a message that identifies either the first resource manager or the second resource manager as a committing coordinator;

receiving a commit request message at the committing coordinator requesting that the first set of changes be committed at the first resource manager and that the second set of changes be committed at the second resource manager; and in response to receiving the commit request message, said committing coordinator causing, as an atomic unit of work, the first set of changes to be committed at the first resource manager and the second set of changes to be committed at the second resource manager.

61. The computer-readable medium of claim 60, wherein the first resource manager and the second resource manager are homogeneous resource managers.

62. The computer-readable medium of claim 60, wherein the first resource manager and the second resource manager are heterogeneous resource managers.

63. The computer-readable medium of claim 60, wherein the step of causing the first set of changes and the second set of changes to be committed as an atomic unit of work includes the step of causing a two-phase commit to be performed between the first resource manager and the second resource manager.

64. The computer-readable medium of claim 60, wherein:

the first resource manager uses a first protocol to communicate with other components;

the second resource manager uses a second protocol to communicate with other components; and the step of causing the first set of changes and the second set of changes to be committed as an atomic unit of work includes the step of the first resource manager and the second resource manager communicating with each other through the use of a gateway device.

65. The computer-readable medium of claim 60, wherein the step of causing the first set of changes and the second set of changes to be committed as an atomic unit of work includes the steps of:

storing a first set of log information in nonvolatile memory at the first resource manager, wherein the first set of log information corresponds to the first set of changes written into nonvolatile memory at the first resource manager; and storing a second set of log information in nonvolatile memory at the second resource manager, wherein the second set of log information corresponds to the second set of changes written into nonvolatile memory at the second resource manager.

66. The computer-readable medium of claim 60, wherein the step of said committing coordinator causing the first set of changes and the second set of changes to be committed as an atomic unit of work includes the step of storing redo information in nonvolatile memory at the committing coordinator, wherein the redo information guarantees that even if the committing coordinator fails, the first set of changes and the second set of changes will atomically be either committed or rollback by both the first and second resource managers.

67. An apparatus for processing a distributed transaction in a distributed computer system, the apparatus comprising:

means for communicating a first set of changes directly to a first resource management means without the first set of changes being received at a second resource management means;

means for communicating a second set of changes directly to the second resource management means without the second set of changes being received at the first resource manager;

means for selecting either the first resource management means or the second resource management means as a committing coordinator; and means for transmitting a commit request message to the committing coordinator to cause said committing coordinator to coordinate, as an atomic unit of work, the first set of changes to be committed at the first resource management means and the second set of changes to be committed at the second resource management means.

68. An apparatus for processing a distributed transaction in a distributed computer system, the method comprising the steps:

means for directly receiving a first set of changes at a first resource management means without receiving the first set of changes at a second resource management means;

means for directly receiving a second set of changes at the second resource management means without the second set of changes being received at the first resource management means;

means for receiving a message that identifies either the first resource management means or the second resource management means as a committing coordinator;

means for receiving a commit request message at the committing coordinator requesting that the first set of changes be committed at the first resource management means and that the second set of changes be committed at the second resource management means; and in response to receiving the commit request message, said committing coordinator causing, as an atomic unit of work, the first set of changes to be committed at the first resource management means and the second set of changes to be committed at the second resource management means.

\* \* \* \* \*